C. C. KLEIN.
Friction Device.
No. 222,504. Patented Dec. 9, 1879.
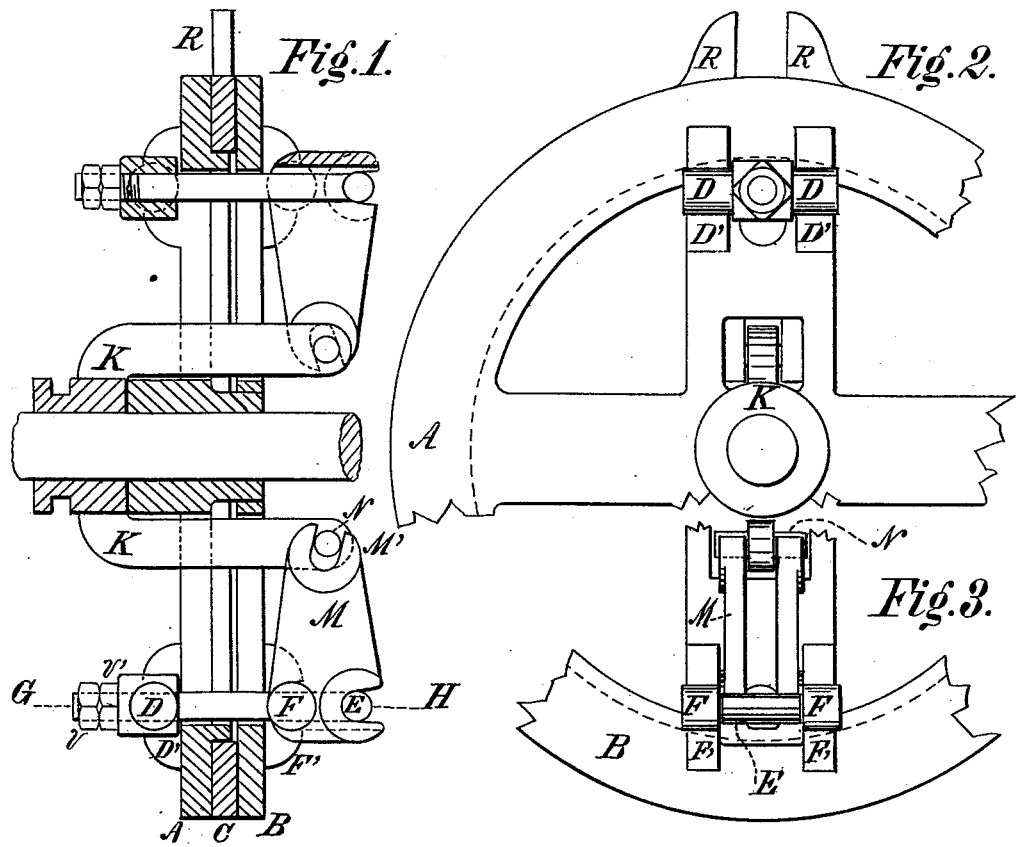
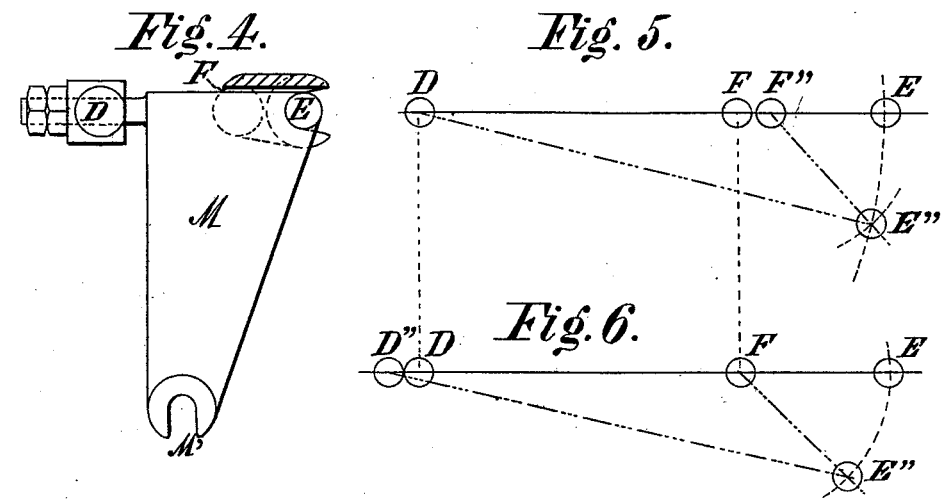
Witnesses.
Chas. E. Pancoast
James McDaid
Inventor.
Chas. C. Klein

UNITED STATES PATENT OFFICE.

CHARLES C. KLEIN, OF PHILADELPHIA, PENNSYLVANIA.

IMPROVEMENT IN FRICTION DEVICES.

Specification forming part of Letters Patent No. 222,504, dated December 9, 1879; application filed September 24, 1879.

*To all whom it may concern:*

Be it known that I, CHARLES C. KLEIN, of Philadelphia, in the county of Philadelphia and State of Pennsylvania, have invented certain new and useful Improvements in Friction Devices for Transmitting or Arresting Motion, of which the following is a specification, reference being had to the accompanying drawings, in which—

Figure 1 is a vertical section of the device. Fig. 2 is a sectional view from the front, and Fig. 3 a sectional view from the rear. Fig. 4 illustrates a modification of the part which connects the friction device proper with its operating mechanism; and Figs. 5 and 6 are illustrative diagrams, showing the action of the pressure-links.

My invention relates to that class of friction devices in which the clutching or griping mechanism moves in a line parallel with the axis of the shaft; and has for its objects, first, to prevent the evil effects caused by the elasticity of the parts which transmit the motion from the operating device to the clutching mechanism; second, to furnish a friction device which will remain engaged without any strain upon the operating device, and yet which can be disengaged with a positive motion when desired; third, to do away with the difficulties arising from wear of co-operative and adjacent parts, which disturb the proper relative position of the frictional surfaces; fourth, to furnish a friction device of such construction that it can be readily attached to existing co-operative parts; or, in other words, that pulleys, wheels, couplings, &c., need not be expressly constructed with reference to the friction device to make it applicable thereto.

One of the most objectionable features of friction devices for transmitting or arresting motion is their liability to spring under heavy pressures, owing to the elasticity of the material of which they are made, which has the effect of permitting the frictional surfaces to slide upon each other under sudden and jerking strains, thereby causing rapid abrasion of these surfaces. In all friction devices in which the frictional pressure acts in a radial direction with the center of motion or of the shaft, the periphery of the part against which the pressure is exerted has to be made enormously heavy, or has to be strengthened by flanges, in order to preserve its circular shape when under pressure. Some of this class transmit the motion from the operating device to the frictional surface by mechanical appliances subject to a transverse strain, and thereby only increase the above-mentioned difficulties.

In another class of friction devices in which the frictional pressure acts in lines parallel with the axis of the shaft, there is much less liability of the frictional surfaces losing their proper shape when subjected to a heavy pressure; but the mechanical appliances which transmit the motion from the operating device to the friction surfaces spring under severe transverse strains brought upon them when the frictional surfaces are under pressure. Generally considered, those in which cones sliding on the shaft are used for bringing the friction-surfaces in contact belong to this class and every part—the cone, the intermediate transmitting mechanism, and the parts having the friction-surface—are under severe strain, and liable to sudden breakage.

To prevent the difficulties arising from elasticity of the materials, I provide, as close to the inner periphery of the frictional surfaces as practicable, two links, D E and F E, Fig. 1, oscillating upon their respective pivots, D and F, and connected to each other by the pivot E.

Neither one of the links is subjected to a transverse strain while the frictional surfaces are under pressure, D E being subject to a tensile, and F E to a compressive strain. Hence the elasticity of the material of which the links are made exerts a much less injurious tendency, it being in tensile and compressive strains at its lowest limit. These strains lie in the direction of the line G H, which is at right angles with the frictional surfaces upon A, B, and C.

The requisite pressure upon the friction surfaces is generated upon the line G H by the motion of the links D E and F E, Figs. 1, 5, and 6, and as the pressure obtainable by this combination has no limit but that of the strength of the parts, it follows that the parts which connect these links with the operating device K, perform no other function than that of transmitting the motion from the slide K to the links D E and F E, and therefore need only be strong enough to overcome the friction and impact of the parts.

Various devices may be interposed between the slide K and links D E, F E, to convert the reciprocating motion of the slide K into the oscillating motion of the links D E and F E; but in order to avoid multiplicity of parts I prefer to attach to, or form in one piece with, the link F E a lever-arm, M, provided at its inner extremity with a jaw, M', which, with the pin N, serves to connect the arm M with the slide K.

When the space which, in practice, is available for the friction device is limited in the direction of the length of the axis, and when in such limited space a friction device of large diameter is to be applied, the proportion of the length of the arm M to that of the link F E becomes very great, and by reason of this even a large amount of reciprocating motion in the slide K produces not sufficient angular motion in the link F E around the pivot F. In such cases I prefer to attach the arm M to the link D E, as indicated in Fig. 4, by which contrivance a much larger amount of angular motion is secured in the links D E and F E for a given amount of reciprocating movement in the slide K, than would be the case if M was attached to F E.

The pivot D of the link D E oscillates in bearings D' upon the friction-plate A, and the pivot F of the link F E moves in the bearing F' in the friction-plate B.

The pivot E upon the link D E oscillates in a suitable depression in the link F E, E being, as heretofore mentioned, a common center of motion of the links D E and F E.

Generally the frictional surfaces are formed directly upon the part from which motion is to be derived or to which motion is to be imparted—as a pulley, for example—which is in so far objectionable, as it often entails difficulties in the manufacture of that part, as the requirement of special and expensive tools, &c., and, moreover, the destruction of the frictional surface by wear often makes a complete replacement of the part necessary.

It is evident that that part of the friction device having motion while the other part is at rest will be most liable to wear, and by that wear and tear the frictional surface upon one part is brought out of its proper relative position with the other part, and hence it is that such friction devices generally operate best when comparatively new, and cause more or less trouble when worn. Now, it will be readily seen that the friction-ring C can be formed in one piece with the pulley, coupling, or other article to which the friction is to be applied, or it could be rigidly attached thereto; yet I prefer, for the purpose of greater facility in finishing and applying the device to already existing articles of transmission, of inexpensiveness in replacing worn-out friction-surfaces, as well as to overcome the difficulties arising from want of accuracy and coincidence of the frictional surfaces, caused either by unequal wear and tear or defective workmanship, to provide a detached ring, C, having at its outer periphery jaws, R, into which lugs upon the pulley, coupling, or other article to which the friction device is applied, may fit loosely, so that, although the ring is put into positive driving connection with the part to which the lugs are attached, any want of accuracy in that part will not affect the friction device.

The clamping of the ring C between the plates A and B by means of the links D E and F E will be more fully understood by reference to the diagrams, Figs. 5 and 6. Let D E and F E, Fig. 5, represent, respectively, the links indicated by the same letters in Fig. 1, and let the link D E be oscillated upon the pivot D until E arrives at E'', then the link F E will have assumed the position F'' E'', and the distance D F will have been elongated to D F'', and the plates A B upon which D and F oscillate are consequently at liberty to recede from the ring C a distance equal to F F''. Now let D E and F E, Fig. 6, represent again these links, and let the link F E be brought into the position F E'', then the link D E will occupy the position indicated by D'' E'', and the distance D F will have again been augmented to D'' F, and the same effect will have been produced.

Theoretically, the pressure which is produced upon the line D E, Figs. 5 and 6, between the points D and F, is in inverse proportion to the amount of motion produced in the points D or F upon the line D E for any given amount of angular motion of E'' toward E. Now, as the amount of rectilinear motion of the points D and F is greatest when the angular motion from E'' begins, the pressure, therefore, is least at that point. As E'' approaches the point E the motion of D and F decreases in a quadratic ratio, until at E it becomes zero, and hence at that point the pressure becomes, in a mathematical sense, infinite. When the device is brought into this position it becomes locked, and all strain upon the operating-slide K and arm M ceases. The wear which naturally takes place upon the frictional surfaces of A, B, and C may be compensated for, first, by elongating the distance between the center of the pivot D and the plate A; second, by elongating the distance between the center of the pivot F and the plate B; third, by increasing the distance between the pivots F and E; and, fourth, by shortening the distance between the pivots D and E. Preferably, I adopt the latter plan, and accomplish it by attaching the pivots D to a hub which is capable of sliding toward the pivot E, and the nuts V V' serve to make the adjustment.

When friction devices are running at high speeds the centrifugal force of the moving parts becomes so great that the appliances commonly used for separating the friction surfaces are inadequate to overcome it, and in such cases the speed has to be diminished before the friction device can be entirely disengaged. Particularly is this the case in that class in which cones sliding upon and parallel with the shaft serve to put the surfaces in contact, and in which springs are used to effect the opposite purpose. In my invention the jaw M' and the pin N form a positive connection between the slide K and lever-arm M, and the centrifugal force which may act upon the links D E and F E is counteracted by drawing K away from the plate A.

What I claim as my invention, and desire to secure by Letters Patent, is—

1. In combination with the friction-plates A and B and links D E and F E, the friction-ring C, substantially as and for the purpose specified.

2. In combination with the friction-plates A and B and friction-ring C, the pressure-link D E, with its adjustable pivot D and the pressure-link F E, substantially as and for the purpose set forth.

3. In combination with the pressure-links D E and F E, the lever-arm M, forming, by means of the jaw M' and pin N, the connection between the slide K and the links D E and F E, substantially as and for the purpose specified.

CHAS. C. KLEIN.

Witnesses:
  CHAS. E. PANCOAST,
  JAMES McDAID.